June 19, 1956  E. STUMP  2,751,580
VEHICLE SPEED INDICATING DEVICE FOR MOTOR VEHICLES
Filed Dec. 16, 1952
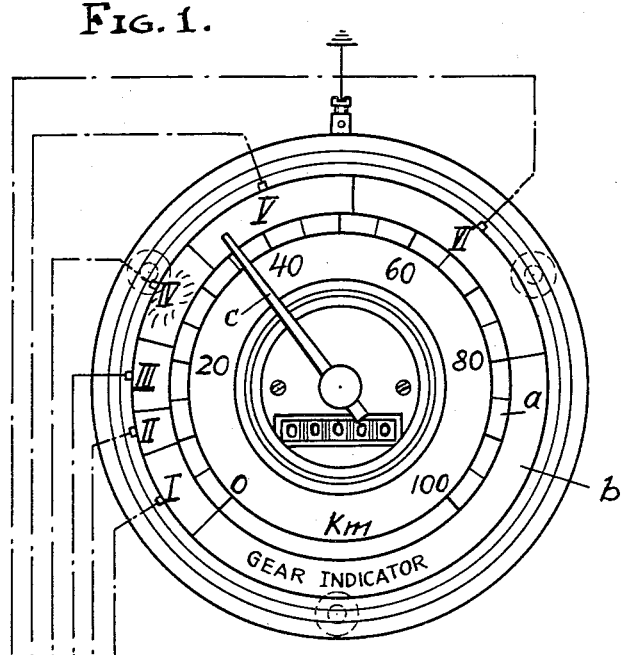
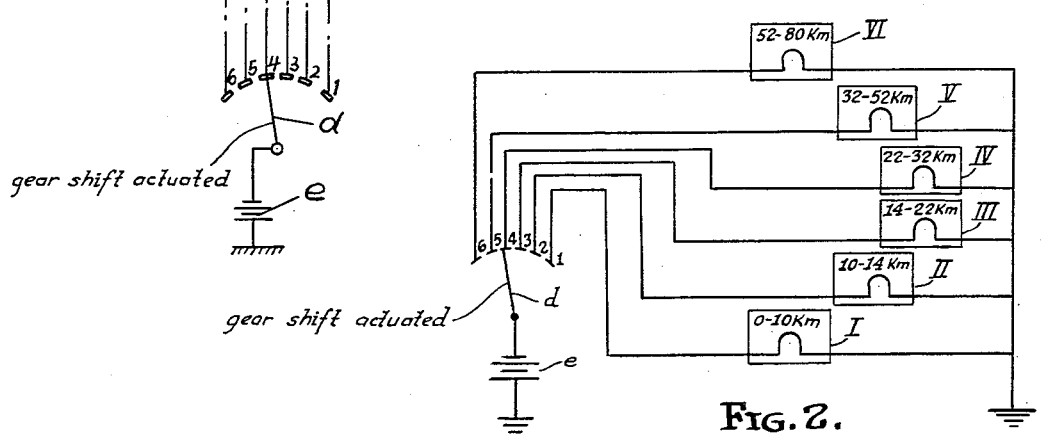
Inventor
Eugen Stump
By Michael and Padlon
Attorneys

United States Patent Office 2,751,580
Patented June 19, 1956

2,751,580

VEHICLE SPEED INDICATING DEVICE FOR MOTOR VEHICLES

Eugen Stump, Stuttgart-Unterturkheim, Germany, assignor to Daimler-Benz Aktiengesellschaft, Stuttgart-Unterturkheim, Germany Application December 16, 1952, Serial No. 326,202

5 Claims. (Cl. 340—263)

The present invention relates to vehicle speed indicators, particularly to such as are used in motor vehicles.

An object of the present invention is to provide an indicating device permitting the observation of the vehicle speed in relation to the engaged speed of the transmission of the vehicle.

A further object of the present invention is to provide an indicating device allowing the driver of the motor vehicle to run the vehicle engine within the range of the most favorable operating speeds.

In motor vehicles, particularly with rear engines, apart from tachometers, speedometers are used for indicating the engine speed, since the driver cannot control the engine speed by listening and thus cannot definitely state when the engine exceeds the normally permissible speed. Such an extra speedometer, however, is relatively expensive. Moreover the simultaneous reading of two instruments requires a particular attention and routine, impairing the driving safety and being apt to cause faulty shiftings.

The present invention aims at simplifying such an indicating device and essentially consists in that the speedometer, apart from the indicating member which is adjusted in dependence on the vehicle speed, is combined with an indicating device for the vehicle speed ranges corresponding to the predetermined speed ranges of the various speeds of the transmission, particularly so that the driver will observe the conformity or nonconformity of the engaged speed of the transmission with the transmission ratio or speed normally required for the particular vehicle speed. It is particularly appropriate to work the indicating device for the individual speeds of the transmission in dependence on the shifted position of the transmission. Preferably light signal devices are used for purposes of indicating which are made to flash up within the individual vehicle speed ranges, appropriately directly at the scale of the speedometer.

Further objects, features and advantages of the present invention will become more obvious from the following description when taken in connection with the accompanying drawing which shows, for purposes of illustration only, one embodiment in accordance with the present invention, and wherein:

Figure 1 is a front view of a speed indicating device provided with a light signal arrangement in accordance with the present invention illustrated schematically therein, and Figure 2 is a schematic wiring diagram of the speed indicating device in accordance with the present invention.

The ring $b$, marked with "gear," arranged in concentric relation to the vehicle speed scale $a$ is partitioned into six ranges I to VI corresponding to the six speeds of the transmission. In each of the ranges a bulb or another lighting device is provided, which is connected with a corresponding contact 1 to 6. By means of a switch lever $d$ connected with the gear-shift lever these contacts can be connected with a power source $e$ corresponding to the same order of the engaged transmission speeds so that in the first gear the current is conducted by way of the contact 1, in the second gear by way of the contact 2, etc.

When, by way of example as illustrated in the drawing, the fourth speed is engaged, and thus the field IV is illuminated, but the pointer $c$ is within the field V, the driver will instantly see that the actual vehicle speed is outside of the range co-ordinated to the engaged speed of the transmission, and he must then shift to the next higher speed. The fields are appropriately screened light-proof from one another and also against floodlight so that the speed gear scale can also be distinctly watched during daylight. By engaging always the particular transmission speed which corresponds to the range of actual vehicle speed, it is possible to avoid unfavorable driving conditions which occur when the engaged transmission speed does not correspond to that transmission speed which is required by the actual vehicle speed as each transmission speed is intended to operate only with a particular predetermined range of vehicle speeds. If the actually engaged speed of the transmission is lower than that indicated by the indicating device in accordance with the present invention, then the engine operates at too high a rotational speed, while the engine will not operate smoothly if the actually engaged speed of the transmission is higher than that indicated by the indicating device in accordance with the present invention.

Furthermore, the individual ranges may be staggered in a peripheral direction, for instance by the ranges being alternatively arranged on an inside and an outside ring. Furthermore, for instance, the arrangement may be laid out so that the light signals of all speeds up to the actually engaged speed gear are switched on.

What I claim is:

1. In a speed indicating device for motor vehicles having a change-speed transmission and means for engaging the individual speeds of said transmission, a speedometer with a scale indicating the vehicle speed and including an indicating member, means operating said indicating member in dependence of the speed of the vehicle, said scale being partitioned into individual ranges, each of said last-mentioned ranges defining a corresponding speed of the transmission, signal means for indicating the particular speed of said transmission engaged and the vehicle speed range coordinated therewith, and means operated by the means for engaging the individual speeds of said transmission for operating said signal means.

2. An indicating device according to claim 1, in which the indicating ranges defining the individual speeds of said transmission are arranged in concentric relation with the vehicle speed scale of the speedometer.

3. An indicating device according to claim 1 wherein said signal means includes lamps and means for flashing said lamps within the ranges of the individual speeds of said transmission in dependence on the engaged speed of the transmission.

4. An indicating device according to claim 3, in which the indicating ranges defined by the individual speeds are screened light-proof from one another.

5. An indicating device according to claim 3, further comprising means for screening said indicating ranges against floodlight.

References Cited in the file of this patent

UNITED STATES PATENTS

| 1,332,810 | Danielson | Mar. 2, 1920 |
| 1,895,260 | Treese | Jan. 24, 1933 |
| 1,911,599 | Bloxsom | May 30, 1933 |
| 1,927,983 | Johnson | Sept. 26, 1933 |
| 2,060,705 | Velo | Nov. 10, 1936 |
| 2,214,100 | Claytor | Sept. 10, 1940 |